United States Patent [19]

Cleaveland

[11] Patent Number: 4,898,470

[45] Date of Patent: Feb. 6, 1990

[54] APPARATUS AND METHOD FOR TESTING CIRCULAR CYLINDRICAL OR CONICAL SURFACES

[75] Inventor: Edwin E. Cleaveland, Rochester, N.Y.

[73] Assignee: Eastman Kodak Company, Rochester, N.Y.

[21] Appl. No.: 218,756

[22] Filed: Jul. 12, 1988

[51] Int. Cl.$^4$ .............................................. G01B 11/00
[52] U.S. Cl. .................................................... 356/359
[58] Field of Search ............... 356/356, 355, 376, 360, 356/430, 359

[56] References Cited

U.S. PATENT DOCUMENTS

| | | | |
|---|---|---|---|
| 3,907,438 | 9/1975 | Holeman | 356/376 |
| 4,009,965 | 3/1977 | Pyror | 356/355 |
| 4,131,365 | 12/1978 | Pyror | 356/356 |
| 4,358,202 | 11/1982 | Puffer et al. | 356/430 |
| 4,606,640 | 8/1986 | Hirst | 356/360 |

OTHER PUBLICATIONS

Hayes et al.; "Testing of Nonlinear Diamond-Tuned Reflaxions"; Appl. Opt., vol. 20, No. 2; 15 Jan. 1981.
Hall et al.; "A Simple Interferometer for the Precise Measurement of the Straightness of Ground Surfaces"; Microtecnic, vol. XVI, No. 1; Feb. '62.

Primary Examiner—Léon Scott, Jr.
Attorney, Agent, or Firm—John B. Turner

[57] ABSTRACT

Apparatus for testing circular cylindrical or conical specularly reflective surfaces of pieces, e.g. optical elements or metal components, to be tested. A collimated light beam from a Fizeau interferometer is directed axially onto a specularly reflective conical surface of a member which reflects the light onto the surface to be tested. The surface to be tested, directly or indirectly, reflects the light onto the conical specularly reflective surface which, in turn, reflects it back towards the interferometer. Information on the trueness of the surface to be tested can be gained from inspection of the pattern of the interference between light projected by the interferometer and light reflected back to the interferometer.

8 Claims, 5 Drawing Sheets

APPARATUS AND METHOD FOR TESTING CIRCULAR CYLINDRICAL OR CONICAL SURFACES

BACKGROUND OF THE INVENTION

1. Field of the Invention

This invention relates to apparatus and method for testing the trueness of a circular cylindrical or conical specularly reflective surface of a piece to be tested.

2. Description Relative to the Prior Art

It is often desirable to test to a high degree of accuracy the surface of, for example, a cylindrical mirror or lens; a cylindrical surface of a bearing component formed of metal; or a conical surface of a metal component or of an optical element, such as an axicon. Such testing might include testing of the trueness of conformity of the actual surface to a perfect surface. The surface of a mirror is inherently specularly reflective. The surface of a lens reflects, specularly, a portion of the light incident on it unless, of course, special steps are taken to prevent such reflection. the surface of a metal bearing component is specularly reflective. Thus, it is possible to test a circular cylindrical surface of, for example, a mirror, a lens or a metal component, or a conical surface of, for example, an optical or metal component, by using light reflected by the surface.

SUMMARY OF THE INVENTION

It is an object of the present invention to provide apparatus for testing the trueness of a circular cylindrical or conical specularly reflective surface of a piece to be tested, to a high degree of accuracy.

In accordance with the present invention there is provided apparatus for use with a Fizeau interferometer for testing the trueness of a circular cylindrical or conical specularly reflective surface of a piece to be tested. The surface has an axis of the interferometer is adapted to project a beam of collimated light. The apparatus includes a member having a conical specularly reflective surface which has an axis. There are means for mounting the piece to be tested with the axis of its surface coincident with the axis of the conical surface of the member. Also, there are means for mounting the member and the tested piece with the axis of the conical specularly reflective surface of the member parallel to the beam of collimated light projected by the interferometer, whereby the projected light is incident on the conical specularly reflective surface of the member. The conical specularly reflective surface of the member has a cone angle such that light reflected by the conical specularly reflective surface of the member is incident on the surface of the piece to be tested and is directly or indirectly reflected thereby onto the conical specularly reflective surface of the member. Thereafter, the light is reflected by the surface of the member towards the interferometer, whereby the light projected by the interferometer and the light reflected by the conical specularly reflective surface of the member towards the interferometer interfere and the interference pattern created may be inspected with the Fizeau interferometer.

The device according to the invention may be constructed to test external or internal cylindrical surfaces. When constructed to test external cylindrical surfaces, that is, surfaces which are convex, the conical specularly reflective surface is an internal surface, that is, the conical surface is concave, and the piece to be tested is disposed within the member having the conical surface.

When constructed for testing internal cylindrical surfaces, that is, surfaces which are concave, the conical specularly reflective surface is an external surface, that is, it is convex, and the member having the conical surface is disposed within the piece to be tested.

The invention also resides in a method of testing the trueness of a circular cylindrical or conical specularly reflective surface of a piece to be tested. The method includes directing collimated coherent light axially onto a conical specularly reflective surface, whereby light is reflected onto the surface of the piece to be tested. The surface to be tested is caused to reflect light, directly or indirectly, onto the conical specularly reflective surface whereby, after reflection by the conical specularly reflective surface, the light is returned axially of the conical surface. The axially directed light and the axially returned light are caused to interfere. The interference pattern is inspected with a Fizeau interferometer to gain information on the trueness of the surface to be tested.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

Figure 1:
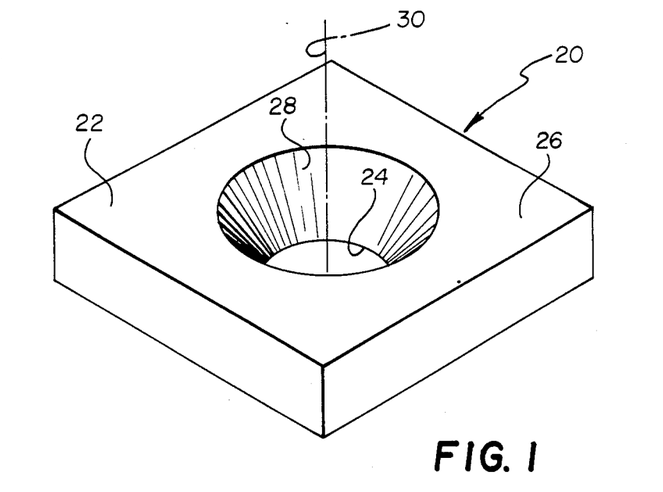
FIG. 1 illustrates a member having a conical specularly reflective surface for use in apparatus in accordance with the present invention.
Figure 2:
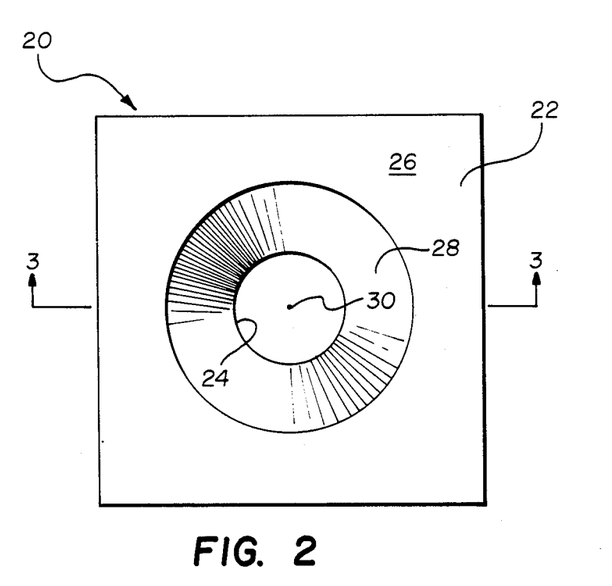
FIG. 2 is a plan view of the member illustrated in FIG. 1.
Figure 3:
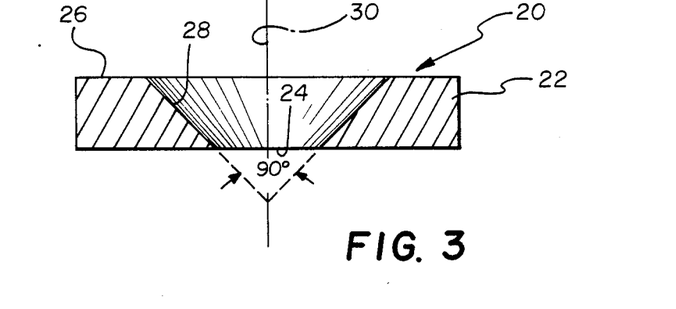
FIG. 3 is a cross-sectional view taken on the line 3—3 in FIG. 2.

Illustrated in FIGS. 1, 2 and 3 is a member 20. The member 20 is in the form of a parallel-sided slab 22 having an aperture 24 extending from one face 26 to the opposite face. The aperture 24 is bounded by a conical surface 28. The conical surface has an axis 30 which bisects the cone angle of the conical surface 28. In the present embodiment the cone angle of the conical surface 28 is 90°. The member 20 is formed of aluminum and its conical surface 28 is specularly reflective. The axial extent of the conical surface is at least equal to the length of a cylindrical piece to be tested.

Figure 4:
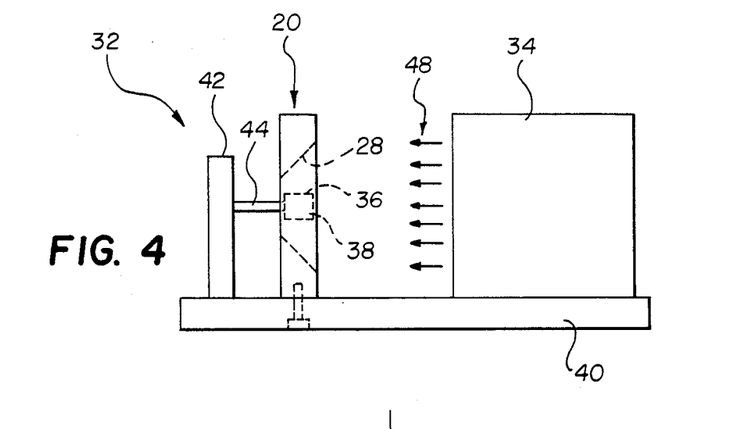
FIG. 4 is a diagrammatic representation of a side elevation of apparatus in accordance with the present invention, including the member illustrated in FIGS. 1, 2 and 3.
Figure 5:
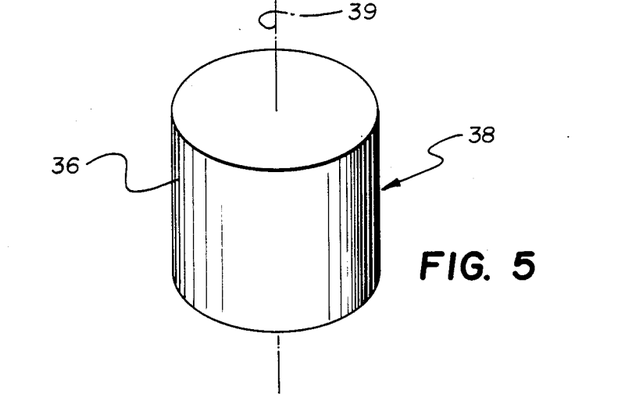
FIG. 5 illustrates a circular cylindrical piece to be tested.

FIG. 4 diagrammatically represents apparatus 32 including the member 20 illustrated in FIGS. 1 to 3, for use with a Fizeau interferometer 34, which is illustrated diagrammatically, for testing the trueness of a circular cylindrical specularly reflective surface 36 of a piece 38 to be tested. As may be seen in FIG. 5, the piece 38 has an axis 39 which is the axis of the circular cylindrical form of the surface 36.

The apparatus includes a base 40. Means for mounting the tested piece are provided in the form of a stand 42 secured to the base 40 and having an arm 44 to which is secured the piece 38 to be tested. The member 20 is secured to the base 40 by bolts 46 extending through the base 40 into the member.

The stand 42 mounts the piece 38 with its axis 39 coincidental with the axis 30 of the conical surface of the member 20.

The Fizeau interferometer 34 is mounted on the base 40 so that light, represented by collimated coherent beam 48, is projected by the interferometer parallel to the axis 30 of the conical surface 28 of the member 20. Thus, the base 40 forms means for mounting the member 20 and the piece 38 to be tested with the axis of the conical specularly reflective surface of the member 20 parallel to the beam of collimated light projected by the Fizeau interferometer 34.

Figure 6:
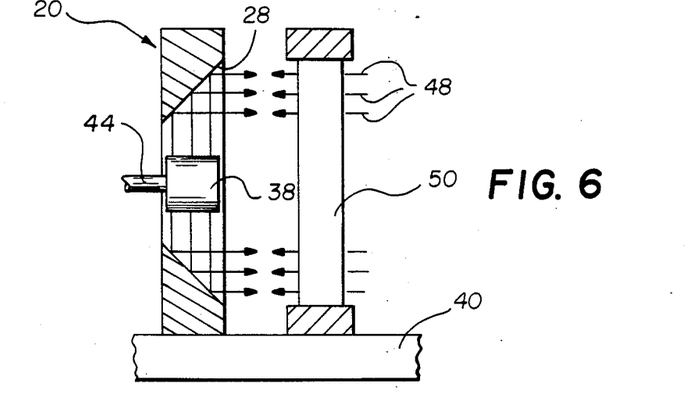
FIG. 6 is a cross-sectional view of a portion of the apparatus illustrated in FIG. 4, with the cylindrical piece to be tested in position in the apparatus.

The interferometer 34 includes a parallel sided glass plate 50, sometimes termed a transmission plano, at which, as is known by those skilled in the use of interferometers, interference between transmitted and reflected rays is caused to occur. The plate is illustrated in FIG. 6.

In use, the interferometer directs the beam 48 of collimated light at the conical surface 28 with the beam parallel with the axis 30 of the conical surface 28. Because the surface is specularly reflective, and because the cone angle of the conical surface 28 is 90°, and because the light is parallel to the axis 30 of the conical surface 28 prior to incidence on the surface 28, the light in the beam 48 is directed perpendicularly to the axes 30 and 39 after reflection by the surface 28. Thus, the light is directed radially at the circular cylindrical surface 36 of the piece 38 to be tested. If the surface 36 is truly circular cylindrical, it retroreflects the light radially away from the axes 30 and 39 towards the conical surface 28. The light is reflected by the conical surface 28 parallel to the axes 30 and 39 towards the plate 50 of the interferometer 34. If the surface 36 of the piece to be tested is truly circular cylindrical, and assuming that the conical surface 28 is also perfect, the interference pattern at the plate 50, created by interference of the beam 48 projected by the interferometer and the light reflected by the conical surface 28 after reflection by the surface 36, will be perfectly regular. If, however, the surface 36 is not true, the interference pattern will not be regular and any irregularity can be interpreted with the aid of the interferometer.

Figures 7, 8:
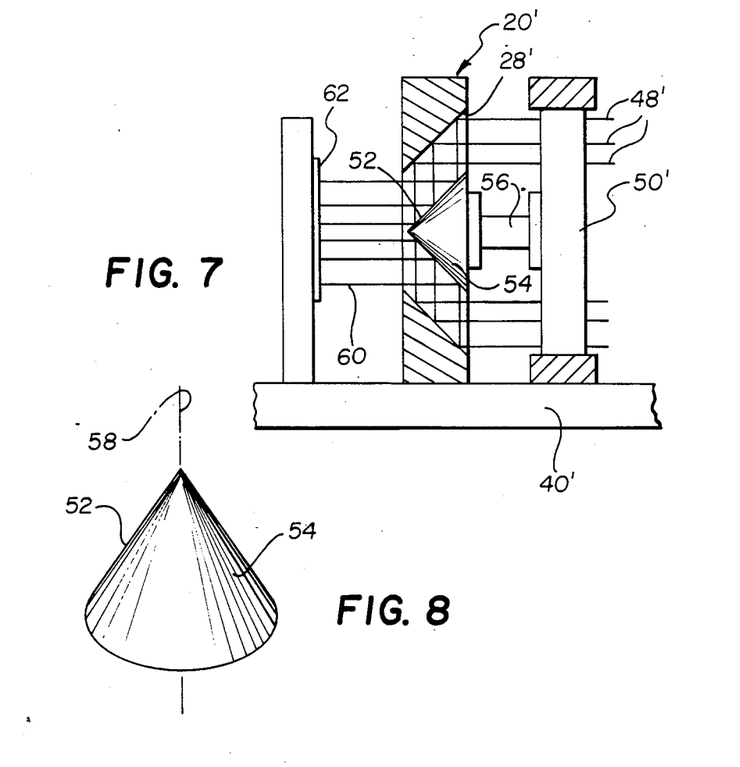
FIG. 7 is a view similar to FIG. 6, but of a second, different embodiment of the invention, with a conical piece in position to be tested.
FIG. 8 illustrates a piece to be tested in the second embodiment.

FIG. 7 illustrates a portion of a second embodiment of the present invention and includes a base 40' on which is mounted a member 20' having a conical specularly reflective surface 28'. The member 20' is similar to the member 28. Also mounted to the base is the plate 50' of a Fizeau interferometer, the remainder of which is not illustrated in FIG. 7. 48' represents the collimated beam of light directed by the interferometer towards the member 20'.

The second embodiment of the invention differs from the first in that it is intended for testing the trueness of a conical specularly reflective surface 52 of a piece 54 to be tested. The piece 54 to be tested is mounted by a support 56, forming mounting means, secured to the plate 50'. The piece 54 has an axis 58, which is the axis of the conical form of the surface 52 of the piece 54, as may be seen in FIG. 8. A support 56 mounts the piece 54 with the axis 58 coincident with the axis of the conical specularly reflective surface 28' of the member 20'. In this embodiment, the support 56 is secured to the plate 50' and, therefore, the support 56 and the plate 50' together with the base 40' form tested piece mounting means for mounting the piece 54 to be tested with the axis 58 of the surface of the piece 54 to be tested coincidental with the axis of the conical specularly reflective surface 28' of the member 20'.

In the second embodiment of the invention, the cone angle of the conical surface 28' of the member 20' is the same as the cone angle of the conical surface 52 of the tested piece 54 so that the light beam 48' after reflection by the surface 28' of the member 20' and by the surface 52 of the tested piece 54, is again directed axially, in the form of the beam 60 illustrated in FIG. 7. If the conical surface 52 of the tested piece 54 is true, and assuming the surface 28' is perfectly conical, the beam 60 will be collimated. The second embodiment also includes a plane mirror 62 mounted on the base 40' with its reflective surface perpendicular to the axes of the surfaces 28' and 52. Because the reflective surface of the mirror 62 is perpendicular to the axes 28' and 58 and, hence, also to the collimated beam 60, the mirror 62 retroreflects the beam 60 so that it is directed back towards the conical surface 62 parallel to the axes 28' and 58. The beam retroreflected by the mirror 62 is reflected by the conical specularly reflective surface 52 onto the conical surface 28' of the member which, in turn, reflects the light so that it is directed towards the interferometer in parallelism with the axes 28' and 58. When the light is incident on the plate 50', it interferes with the beam 48' directed outwardly of the interferometer. As in the first embodiment, if the conical surface 62 of the tested piece 54 is true, the interference pattern, observable with the interferometer, will be regular. However, if the conical surface of the tested piece is not true, there will be an irregularity in the interference pattern, which irregularity is interpretable with aid of the interferometer.

In that in the second embodiment, just described, the light is reflected by the surface 52 onto the mirror 62 by which it is reflected back onto the surface 52 which in turn reflects it onto the surface 58 of the member 20', it may be said that the light is indirectly reflected by the surface of the piece to be tested onto the conical surface of the member. This is in distinction to the first embodiment herein described, in which light is reflected by the surface 36 of the tested piece 38 directly back onto the conical surface of the member without intervening reflections.

Figure 9:
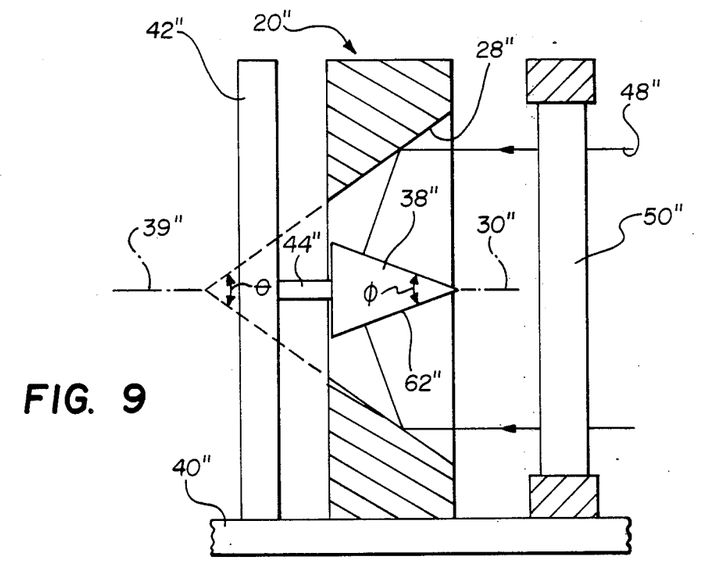
FIG. 9 is a view, similar to FIGS. 6 and 7, but of a third embodiment of the invention, also suitable for testing a conical component.

A third embodiment of the present invention is illustrated in FIG. 9. This embodiment is intended for testing the trueness of a conical specularly reflective surface of a piece to be tested. The third embodiment includes a base 40" from which is mounted the plate 50" of a Fizeau interferometer (not otherwise illustrated in FIG. 9). A member 20", generally similar to the members 20 and 20', is also mounted on the base 40". The member 20″ has a conical specularly reflecting surface 28″ which has an axis 30″. A piece 38″ to be tested is mounted from the base 40″ by a stand 42″ having an arm 44″ to which the piece 38″ is secured. The piece 38″ has a conical specularly reflective surface 62″ which has an axis 39″. In this, third, embodiment, the surface 28″ of the member 20″ has a cone angle $\theta$ and the conical surface 38″ of the tested piece 38″ has a cone angle $\phi$. The tapers of the two conical surfaces 28″ and 62″, respectively, are oppositely directed. The relationship between $\theta$ and $\phi$ is given by $$\theta = 90 - \phi/2$$

and with such a relationship and with the tapers oppositely directed, the light in the beam 48″, after reflection by the surface 28″, is directed perpendicularly at the surface 62″ of the tested piece 38′. Because the light is directed perpendicularly at the surface 62″ the light is retroreflected by the surface 62″ towards the surface 28″ and is reflected by the latter back towards the interferometer in parallelism with the beam 48″. The light reflected back towards the interferometer is incident on the plate 50″ where it interferes with the outwardly directed beam 48″. If the surface 62″ is true, the interference pattern will be regular. If the surface 62″ is untrue, the interference pattern will be irregular and can be interpreted with the assistance of the interferometer.

In the third embodiment just described, the light is reflected directly by the surface 60″ back onto the surface 28″ without intervening reflections. Thus, of such an embodiment it may be said that the light is directly reflected by the surface of the piece to be tested onto the conical surface of the member.

Figure 10:
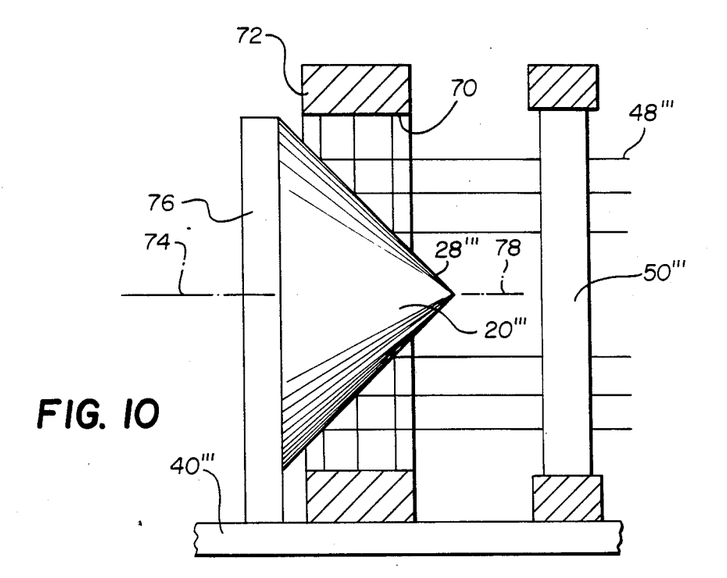
FIG. 10 is a view similar to FIGS. 6, 7 and 9, but of a fourth embodiment of the present invention, suitable for testing the internal circular cylindrical surface of a piece to be tested.

In each of the three embodiments specifically described above, the surface to be tested is an external surface, that is, a convex surface. Embodiments of the invention may be constructed which are suitable for testing internal surfaces, that is, concave surfaces. FIG. 10 illustrates a portion of a fourth embodiment, for testing the trueness of an internal circular cylindrical surface 70 of a piece 72 to be tested. The piece 72 is in the form of an annulus and might be a bearing part. The surface 70 is specularly reflective and has an axis 74. The piece is mounted from a base 40′″.

A member 20′″ having a conical specularly reflective surface 28′″ having an axis 78, is carried by a support 76 secured to the base 40′″. The support 74 forms means for mounting the tested piece 72 with the axis 74 of the surface 70 coincident with the axis 78 of the conical surface 28′″ of the member 20′″. The plate 50′″ similar to the plates 50, 50′, and 50″, and forming a part of a Fizeau interferometer, not otherwise shown in FIG. 10 or described in relation thereto, is illustrated in FIG. 10.

Light is directed in a beam 48′″ onto the conical surface 28′″ of the member which has a cone angle of 90°. Because the axis 78 of the conical surface is parallel to the axis of the beam 48′″, the surface 28′″ reflects the light incident on it and directs it radially outwardly, that is, in directions perpendicular to the axis 78. The reflected light is then incident on the surface 70 of the piece to be tested. Because the surface 70 is circular cylindrical and its axis 74 is coincident with the axis 78 of the conical surface 28′″, light incident on the surface 70 is retroreflected. The retroreflected light is incident on the conical surface 28′″ and is reflected in a direction parallel to the beam 48′″ towards the interferometer. When the reflected light is incident on the plate 50′″ it interferes with the light in the beam 48′″ directed towards the member 20′″. If the surface 70′″ of the piece to be tested is true, the interference pattern created at the plate 50′″ will be regular. If the surface 70 is not true the interference pattern will be irregular and can be interpreted with the aid of the interferometer.

Because the light reflected by the surface of the piece to be tested is reflected directly back onto the surface 28′″ of the member 20′″ without intervening reflections, it may be said of the fourth embodiment that the light is directly reflected by the surface of the piece to be tested.

Figure 11:
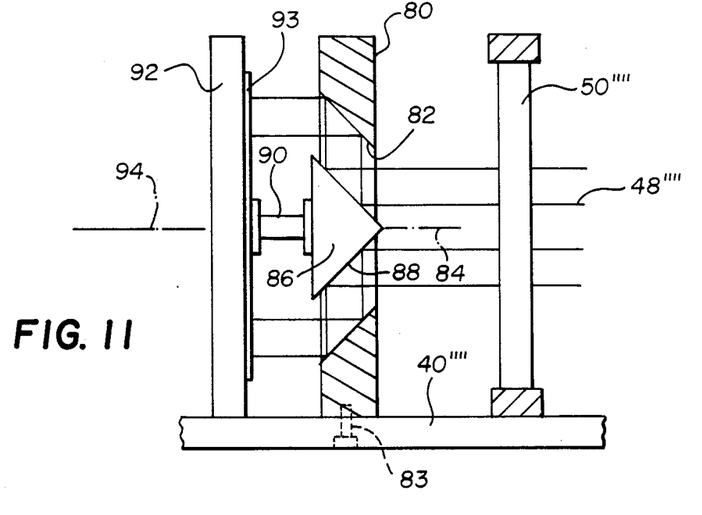
FIG. 11 is a view, similar to that of FIGS. 6, 7, 9 and 10, but of a fifth embodiment of the present invention, suitable for testing an internal conical surface of a piece to be tested.

FIG. 11 illustrates a portion of a fifth embodiment of the present invention, intended for testing the trueness of an internal conical specularly reflecting surface of a piece to be tested. The piece to be tested is given the reference numeral 80 in FIG. 11 and its conical surface is given the reference numeral 82. The tested piece is mounted on a base 40″″ and is secured thereto by set screws 83. The conical form of the surface 82 has an axis 84. A member 86 having a conical spectrally reflective surface 88 is carried by an arm 90 of a support 92 secured to the base 40″″. The conical form of the surface 88 of the member 86 has an axis 94. the base 40″″ and the set screws 83 form tested piece mounting means for mounting the piece to be tested with the axis 94 of the piece 80 to one tested coincidental with the axis 94 of the conical specularly reflective surface 88 of the member 86. The base 40″″, the support 92 and arm 90 form means for mounting the member 86 and the tested piece 80 with the axis of the conical specularly reflective surface 88 of the member 86 parallel to the beam 48″″ of the collimated light projected by the Fizeau interferometer (not shown except for the plate 50″″), whereby the projected light is parallel to the axis 84 and is incident on the conical specularly reflective surface 88 of the member.

The support 92 has a mirror 93 on its surface facing the member 86. The plane of the mirror is perpendicular to the axis 94. The mirror is planar and specularly reflective.

Light in the beam 48″″ projected by the interferometer towards the member 86 is reflected by the surface 88 of the member onto the surface 82 of the piece to be tested. Because the cone angle of the surfaces 88 and 82 are the same and their tapers are similarly directed, light incident on the surface 82 is reflected by the surface 82 in a direction parallel to the axis 94. The light reflected by the surface 82 is incident on the mirror 93 which retroreflects it onto the surface 82. The surface 82, in turn, reflects the light towards the surface 88 which reflects the light in a beam towards the interferometer. When the light is incident on the plate 50″″, it interferes with light in the beam 48″″. If the surface 82 is true, the interference pattern at the plate 50″″ is regular. If the surface 82 is not true, there will be irregularities in the interference pattern which can be interpreted with the aid of the interferometer.

Because light reflected by the surface 82 of the piece 80 to be tested is directed towards the mirror by which it is reflected onto the surface 82 which then reflects the light onto the surface 88 of the member 86, it may be said that the light is indirectly reflected by the surface of the tested piece onto the surface of the member.

In each of the above-described embodiments, it is assumed that the conical specularly reflective surface of the member is itself true. It is on the basis of such an assumption that it is said that the interference pattern created at the plate is regular if the surface of the piece being tested is true. It may be that it is not possible to get a perfectly true surface on the member. In such a case, the interference pattern created by a true tested piece can be placed in memory (such pattern containing irregularities by virtue of the imperfection of the surface of the member) and the interference pattern created when a piece to be tested is in the apparatus, is compared with the pattern in memory. It would then be the differences between the stored pattern and the pattern generated in a test which would be interpreted to give information on the trueness of the surface of the piece being tested.

The invention has been described in detail with particular reference to a presently preferred embodiment, but it will be understood that variations and modifications can be effected within the spirit and scope of the invention.

What is claimed is:

1. Apparatus for use with a Fizeau interferometer for testing the trueness of a circular cylindrical or conical specularly reflective surface of a piece to be tested, said surface having an axis, the interferometer being adapted to project a beam of collimated light, said apparatus including:

a member having a conical specularly reflective surface having an axis;

tested piece mounting means for mounting the piece to be tested with the axis of the surface of the piece to be tested coincidental with the axis of the conical specularly reflective surface of said member;

means for mounting said member and said piece to be tested with the axis of said conical specularly reflective surface of said member parallel to the beam of collimated light projected by the Fizeau interferometer, whereby the projected light is incident on said conical specularly reflective surface of said member;

said conical specularly reflective surface of said member having a cone angle such that light reflected by said conical specularly reflective surface of said member is incident on the surface of the piece to be tested and is directly or indirectly reflected thereby onto the conical specularly reflective surface of said member and is reflected by said surface of said member axially of the conical specularly reflective surface of said member towards the interferometer, whereby the light projected by the Fizeau interferometer and the light reflected by the conical specularly reflective surface of said member towards the interferometer interfere and the interference pattern created may be inspected with the Fizeau interferometer.

2. Apparatus as claimed in claim 1 for testing the trueness of a conical specularly reflective surface of a piece to be tested, wherein the light is indirectly reflected by the surface of the piece to be tested, and wherein:

the cone angles of the conical specularly reflective surface of said member and of the conical specularly reflective surface of the piece to be tested are the same so that the light reflected by the conical specularly reflective surface of the piece to be tested, is directed parallel to said axes; said apparatus further including:

a planar mirror disposed with its plane perpendicular to said axes whereby light reflected by the conical specularly reflective surface of the piece to be tested towards said mirror is retroreflected parallel to the axes towards the conical specularly reflective surface of the piece to be tested by which it is reflected onto the conical specularly reflective surface of said member for reflection towards the interferometer.

3. Apparatus as claimed in claim 1, for testing the trueness of a circular cylindrical specularly reflective surface of a piece to be tested, wherein:

the cone angle of the conical specularly reflective surface of said member is 90° and the light is directly reflected by the circular cylindrical specularly reflective surface of the piece to be tested onto the conical specularly reflective surface of said member.

4. Apparatus as claimed in claim 1, for testing the trueness of a conical specularly reflective surface of a piece to be tested, wherein the light is reflected by the conical specularly reflective surface of the piece to be tested onto the conical specularly reflective surface of said member, and wherein:

the relationship between the cone angle $\phi$ of the conical specularly reflective surface of the piece to be tested and the cone angle $\theta$ of said member is given by:

$$\theta = 90 - \phi/2$$

5. Apparatus for use with a Fizeau interferometer for testing the trueness of a circular cylindrical or conical specularly reflective surface of a piece to be tested, said circular cylindrical or conical surface having an axis which is the axis of the circular cylindrical or conical form of the surface, the interferometer being adapted to project a beam of collimated light; said apparatus including:

a member having a conical specularly reflective surface having an axis;

tested piece mounting means for mounting the piece to be tested with the axis of its surface coincident with said axis of said conical surface of said member;

means for mounting said member and the tested piece relative to a Fizeau interferometer so that the axis of said conical surface of said member is parallel to the beam of collimated light projected by the interferometer and the projected light is incident on said conical surface of said member, the cone angle of said conical surface of said member being such that projected light reflected by said conical surface of said member is incident on the circular cylindrical or conical surface of the piece to be tested at a zero angle of incidence, whereby the light is retroreflected by the circular cylindrical or conical surface of the piece to be tested onto the conical surface of said member by which it is reflected for interference with light projected by the interferometer, and the interference pattern created may be inspected with the Fizeau interferometer.

6. Apparatus for testing the trueness of a cylindrical specularly reflective surface of a piece to be tested, including:

a member having a conical specularly reflective surface, said conical surface having an axis, the cone angle of said conical surface being 90°;

means for mounting the piece to be tested with the axis of its cylindrical surface coincident with said axis of said conical surface; and a Fizeau interferometer including means for projecting collimated light parallel to said axis of said conical surface onto said conical surface, whereby the light is reflected by said conical surface onto the cylindrical surface and is retroreflected by the cylindrical surface onto said conical surface and is reflected by said conical surface;

said interferometer also including a transmission plano so disposed as to be traversed by the light projected towards said conical surface and the light reflected by said conical surface, whereby an interference pattern is created at the transmission plano by interference between the light projected at the conical surface and the light reflected from said conical surface; said interference pattern being inspectable with the interferometer for deriving information concerning the trueness of the cylindrical surface.

7. Apparatus for testing the trueness of a circular cylindrical or conical specularly reflective surface of a piece to be tested, said surface having an axis which is the axis of the circular cylindrical or conical form of the surface, the inclination of a straight line which is a generator of the surface, to the axis, being $\theta$ including:

a member having a conical specularly reflective surface, said conical surface having an axis, the cone angle of said conical surface being $(90-\theta)°$;

means for mounting the piece to be tested with the axis of its circular cylindrical or conical surface coincident with said axis of said conical surface of said member; and a Fizeau interferometer including means for projecting collimated light parallel to said axis of said conical surface onto said conical surface, whereby the light is reflected by said conical surface onto the surface of the piece to be tested and is retroreflected by the surface of the piece to be tested onto said conical surface and is reflected by said conical surface;

said interferometer also including a transmission plano so disposed as to be traversed by the light projected towards said conical surface and light reflected by said conical surface; whereby an interference pattern is created at the transmission plano by interference between the light projected at the conical surface and light reflected from said conical surface; said interference pattern being inspectable with the interferometer for deriving information concerning the trueness of the circular cylindrical or conical surface of the piece to be tested.

8. A method of testing the trueness of a circular cylindrical or conical specularly reflective surface of a piece to be tested, including:

directing collimated coherent light axially onto a conical specularly reflective surface, whereby the light is reflected onto the surface of the piece to be tested;

causing the surface of the piece to be tested to reflect the light directly or indirectly onto the conical specularly reflective surface whereby, after reflection by the conical specularly reflective surface, the light is returned axially of the conical surface;

causing the axially directed light and the axially returned light to interfere;

and inspecting the interference pattern with a Fizeau interferometer to gain information on the truness of the surface to be tested.

* * * * *